Figure 1:
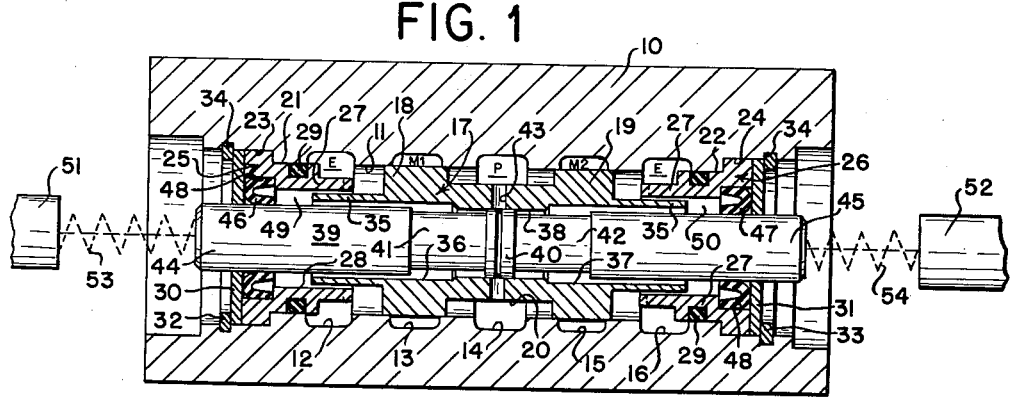

Oct. 30, 1962 W. ASLAN 3,060,969
HYDRAULIC VALVE
Filed Feb. 24, 1960

INVENTOR
Wilfred Aslan
BY
ATTORNEYS

United States Patent Office 3,060,969
Patented Oct. 30, 1962

3,060,969
HYDRAULIC VALVE
Wilfred Aslan, New York, N.Y., assignor to Alkon Products Corporation, Hawthorne, N.J., a corporation of New York
Filed Feb. 24, 1960, Ser. No. 10,710
13 Claims. (Cl. 137—623)

The present invention relates to fluid valves, particularly hydraulic valves, and is concerned more specifically with improvements in the design and operation of pilot-operated hydraulic valves, to the end that actuation or control of the valve may be carried out with greater ease and efficiency.

Hydraulic control valves conventionally are provided a valving spool, which is received slidably in a valve body and is movable to a plurality of operative valving positions, in which desired ports in the valve body are placed in communication. In a typical, four-way valve, for example, such a valving spool may have three operative positions: a neutral position in which the fluid supply is cut off from a fluid motor associated with the valve, a first actuated position in which pressure fluid is connected to one side of the motor and an exhaust port is connected to the other side of the motor, and a second actuated position in which the connections to the fluid motor are reversed. Frequently, the fluid pressures controlled by the valve are of such magnitude as to render difficult or unexpedient the direct manipulation of the valving spool, particularly by means such as solenoids, in which event small pilot valve means may be associated with the main valving spool, in a manner to permit the source fluid pressure to be utilized in shifting the valving spool to its various operative positions.

The present invention is directed particularly to the provision of a pilot-operated hydraulic valve assembly which is characterized by the extremely low actuating forces required to be applied to the pilot valving system. The improved valve of the invention is adapted particularly for, although not necessarily limited to, valve assemblies in which manipulation of the pilot valve member is effected by means of solenoids.

In conventional solenoid-actuated valves, the cost of the solenoids represents a significant portion of the overall cost of the valve and, by means of the improved design of the present invention, the solenoid power required to actuate a given valve is drastically reduced, permitting the use of much smaller, and therefore less expensive, solenoids. By way of example only, a typical four-way solenoid-actuated hydraulic valve of average flow capacity and pressure specifications may require for its actuation one or more solenoids capable of withstanding an inrush current of about 10 to 15 amperes. In contrast, a similar valve, in so far as capacity and specifications are concerned, but incorporating the new design, may be actuated using solenoids designed for about one ampere of inrush current. Additionally, in a four-way valve for example, spring means conventionally are provided to return the pilot plunger to its neutral, centered position and, in a typical valve of the type described above, a spring force of at least about six pounds is required whereas, in accordance with the invention, a spring force of less than 2½ pounds is more than ample.

In accordance with the invention, a novel pilot-operated hydraulic valve is provided which includes a movable pilot valve member or plunger which forms, in part, a chamber for receiving pressure fluid. An effective end surface of the valving spool is exposed to such chamber and, when pressure fluid is admitted thereto, the valving spool is shifted to a desired operative position. The particularly significant aspect of the new design resides in the provision of a resilient, distortable sealing element which engages and forms a seal with the pilot plunger and forms in part the pressure chamber, the arrangement of the valve parts being such that, prior to actuation of the pilot plunger by solenoid or other means, the sealing element bears very lightly against the plunger and offers little resistance to movement thereof, whereas, when pressure fluid is admitted to the chamber, the sealing element is distorted by the pressure and urged into substantial sealing engagement with the plunger.

As one of the more specific advantageous features of the invention, the pressure chamber is in communication with fluid inlet and exhaust passages, and these respective passages are so designed that the fluid inlet passage is of greater effective area than the exhaust passage, the latter being open to exhaust at all times, or at least prior to an actuating movement of the plunger. When pressure fluid is admitted to the chamber, its escape through the exhaust passage is impeded, by reason of the relatively restricted nature of the exhaust passage, permitting a build-up of fluid pressure within the chamber to effect the necessary actuating movement of the valving spool. When the actuating movements of the valve parts has been completed, the chamber is cut off from the pressure fluid supply and the fluid within the chamber drains off through the restricted exhaust passage to ready the valve for a further actuation.

Figure 2:
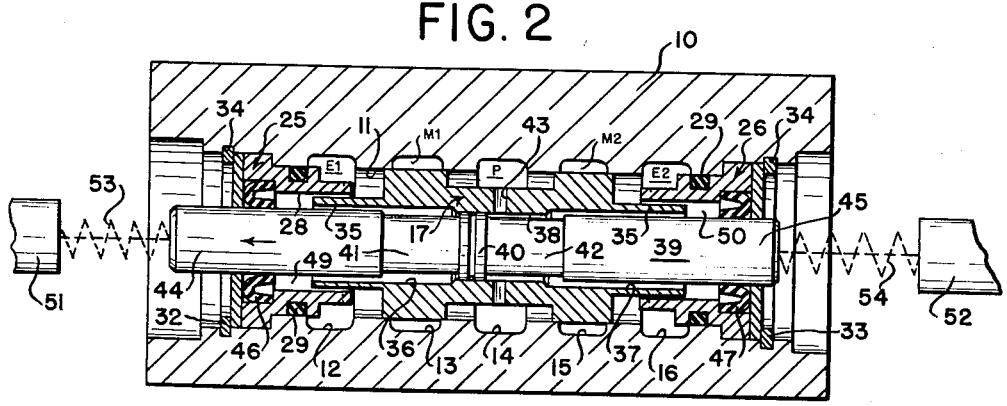
Figure 3:
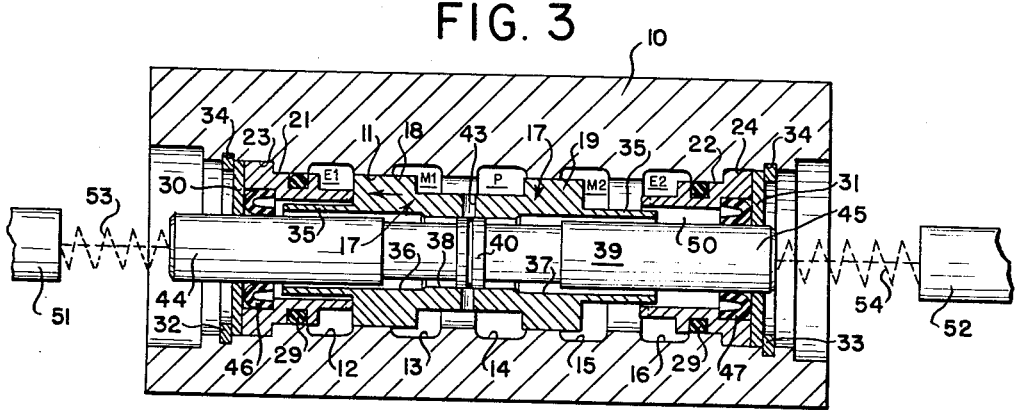

The invention also resides in certain specific features of construction of valves of the type and having the characteristics above referred to, all to the end of providing a substantially improved and efficient overall valve assembly. For a better understanding of these and other novel and advantageous features of the invention, reference should be made to the following detailed description, and to the accompanying drawing, in which:

FIG. 1 is a longitudinal, cross sectional view of a four-way, pilot-operated hydraulic valve incorporating the features of the invention; and FIGS. 2 and 3 are longitudinal, cross sectional views of the valve of FIG. 1, illustrating the valving parts in various positions.

Referring now to the drawing, and initially to FIG. 1 thereof, the reference numeral 10 designates a valve body, which may be formed of cast aluminum, for example, and which is provided with a central bore 11 and a plurality of axially spaced annular recesses 12–16. The valve body 10 is provided with flow passages, sufficiently conventional to require no description, which connect the central recess 14 with a source of pressure fluid, the end recesses 12, 16 with exhaust, and the intermediate recesses 13, 15 to the opposite "terminals" of a fluid motor (not shown), such as a hydraulic cylinder. Advantageously, the cylindrical areas between the several recesses 12–16 are suitably treated to be extremely hard and highly resistant to wear. These surfaces form active valving lands, as will be described.

Slidably received in the main bore 11 of the valve body is a valving spool 17, of generally cylindrical form, which is provided with spaced, annular valving lands 18, 19, between which is an annular recess 20. The spacing of the lands 18, 19 coincides with that of the annular recesses 13, 15 leading to the fluid motor, and the width of the lands is somewhat greater than that of the recesses. Accordingly, when the valving spool 17 is centered in the valve body 10, the recesses 13, 15 are closed off completely and the pressure fluid which enters the valve body through the port P, formed by the central annular recess 14, is contained between the lands 18, 19.

When the valving spool 17 is shifted to the left, for example, as illustrated in FIG. 3, an outlet port M formed by the recess 13, is connected to the pressure port P. At the same time, a port M2, formed by the recess 15, is connected to an exhaust port E2, formed by the recess 16.

Fluid pressure is thereupon directed through the ports P and M1 to one side of the fluid motor, while fluid is exhausted from the other side of the motor through ports M2 and E2. Similarly, if the valving spool 17 is shifted to the right, pressure fluid is directed from the port P through the port M2 to the fluid motor, while fluid is exhausted from the motor through ports M1 and E1, the latter being formed by the recess 12. The operation of the fluid motor is thereby reversed.

Advantageously, the outer end portions of the main bore 11 define sealing lands 21, 22 and immediately outside the sealing lands the valve body 10 is counter-bored to provide enlarged recesses 23, 24 forming transverse shoulders. Received in the recesses 23, 24 are flanged insert sleeves 25, 26, respectively, which have portions 27 extending axially inward. In the illustrated valve construction, the sleeve portions 27 have central bores 28 of substantially smaller diameter than the main bore 11 in the valve body, and the inner extremity of each sleeve portion 27 terminates near the edge of the valving land immediately adjacent the exhaust port E1 or E2. The end portions of the sleeves 25, 26 thus may be used to form abutment shoulders to limit axial movement of the valving spool 17 in the valve body by engagement of the shoulders with end surfaces of the valving lands 18, 19.

Advantageously, the insert sleeves 25, 26 are provided with external, annular grooves receiving O-rings 29 to form fluid seals between the sleeves and the main bore 11 of the valve body. The sleeves 25, 26 are locked in place in the valve body by means of apertured guide washers 30, 31, which are received in the recesses 23, 24 and engage the flanged outer portions of the sleeves, and by snap-retaining rings 32, 33, received in grooves 34 provided in the valve body.

In accordance with one aspect of the invention, and as will be explained in greater detail hereinafter, the valving spool 17 is provided at each end with a sleeve-like extension 35 whose outside diameter is less, by a predetermined small amount, than the inside diameter of the sleeve bores 28. The length of the extensions 35 advantageously is such, in relation to the maximum stroke of the valving spool and the length of the extensions 27 of the insert sleeves, that the sleeve-like extensions 35 are partially received within the bores 28 in any position of the spool.

In the illustrated, advantageous form of the invention, the valving spool 17 is provided with recesses 36, 37 extending axially from each end toward the center of the spool, and the central portion of the spool is bored at 38 to connect the recesses 36, 37, the bore 38 being somewhat smaller in diameter than the recesses. Received within the valving spool 17 and guided by the central bore 38 therein, is a pilot plunger 39 which extends outwardly of the spool at each end. On opposite sides of a central portion 40 of the pilot plunger, are annular recesses 41, 42 of sufficient length to extend into the recesses 36, 37 respectively in any operative relationship of the pilot plunger and the valving spool. The central portion 40 of the plunger forms a valving land and cooperates with radial bores 43 in the valving spool to control the admission of pressure fluid into the recesses 36, 37. Thus, in the illustration of FIG. 1, where the pilot plunger 39 is centered with respect to the valving spool 17, the valving land 40 on the plunger covers the radial bores 43 and isolates the recesses 36 and 37 from the pressure fluid. If the plunger 39 is shifted to the left relative to the spool, as is shown in FIG. 2, communication is established between the pressure port P and the right hand recess 37 of the spool, through the radial bores 43 and along the annular space provided by the recess 42 in the plunger. Likewise, if the plunger 39 is shifted to the right, the left recess 36 is placed in communication with the pressure port P.

In accordance with the invention, the diameter of the outer portions 44, 45 of the plunger 39 is such, in relation to the diameter of the recesses 36, 37, as to form annular flow passages leading axially outward of the ends of the valving spool and having an effective area greater than the effective area provided between the outer surfaces of the sleeve extensions 35 and the bores 28 of the insert sleeves. Also in accordance with the invention, resilient distortable sealing elements 46, 47, of annular form, are inserted between the sleeves 25, 26 and the outer end portions of the pilot plunger. The sealing elements 46, 47 are positioned in counter-bored recesses 48 in the insert sleeves and are held therein by the apertured guide washers 30, 31. As illustrated, the outer end portions of the pilot plunger project through the central apertures in the washers 30, 31, which thus serve to guide and support the pilot plunger adjacent its ends.

Advantageously, the sealing elements 46, 47 are of U-shaped cross section, with the legs of the U directed inwardly, toward the center of the valve body. One of the legs of each element is in sealing engagement with an insert sleeve, while the other leg is in sealing engagement with an outer portion of the pilot plunger. The normal inside diameter of the sealing elements 46, 47 is such, in relation to the diameter of the outer portions 44, 45 of the pilot plunger, that the sealing elements normally engage the pilot plunger 39 with very light pressure, offering little resistance to movements of the plunger.

In accordance with the invention, the outer portions of the pilot plunger 39, in combination with the sealing elements 46, 47, the extensions 27 of the insert sleeves, and effective end surface portions of the valving spool defined by the ends of the sleeve extensions 35 thereof, form pressure chambers 49, 50, which communicate with the annular fluid inlet and exhaust passages formed by the plunger, sleeve extensions 35 and inserts 25, 26. When pressure fluid is admitted to the chamber 49, for example, it acts against the effective end surface of the valving spool 17, formed by the end of the sleeve extension 35, to apply an unbalanced force to the spool and effect movement thereof to the right to a predtermined valving position.

In the illustrated form of the invention, the pressure chambers 49, 50 are open constantly to exhaust, but the effective areas of the exhaust passages are less than the effective areas of the inlet passages, so that fluid pressure will build up in the chambers when fluid is admitted thereto. However, when the fluid inlets are closed, the chamber pressure is relieved quickly through the restricted exhaust passages.

When the valve assembly in in a neutral condition, as shown in FIG. 1, the plunger 39 is centered with respect to the valve body 10 and spool 17 and the valving land 40 of the plunger closes off the radial bores 43 leading to the pressure port P. At this time, the pressure chambers 49, 50 are under no substantial positive pressure, being open to exhaust only and isolated from the source of pressure fluid.

To actuate the valve, the pilot plunger 39 is shifted to the left, for example, as shown in FIG. 2, and it will be understood that this may be accomplished with a minimum force since the sealing elements 46, 47 bear with light pressure on the plunger by reason of the absence of fluid pressure within the chambers 49, 50. When the plunger is shifted sufficiently to uncover the radial bores 43, pressure fluid is directed into the spool recess 37 and caused to flow axially into the right hand pressure chamber 50. As pressure builds up in the chamber, the sealing element 47 tends to distort and the opposite legs thereof are urged into tight sealing engagement with the plunger 39 and insert 26.

Unbalanced fluid pressure in the chamber 50 causes the valving spool to shift to the left, substantially as indicated in FIG. 3, whereby the pressure port P is connected to the motor port M1 and the motor port M2 is connected to the exhaust port E2. The spool 17 has a follow-up movement with respect to the pilot plunger 39 and ultimately causes the radial bores 43 to be closed off, discontinuing the further flow of pressure fluid to the chamber 50. The continued exhausting of fluid from the chamber, through the restricted annular passage between the sleeve-like extension 35 and insert 26 quickly reduces the fluid pressure in the chamber 50.

Following the above-described sequence of operations, the pressure chambers 49, 50 remain exhausted until the valve is actuated to a neutral or other position by further manipulation of the pilot plunger 39. The plunger, of course, moves easily, as the sealing elements 46, 47 are undistorted by fluid pressure and bear only lightly against the plunger.

In an advantageous practical embodiment of the invention, movements of the pilot plunger 39 are effected by means of solenoids 51, 52 located at opposite ends of the plunger 39 and operatively engaged therewith. Suitable springs 53, 54 also act upon the plunger, urging it to its centered or neutral position with respect to the valve body. Particularly significant advantages are realized when solenoid actuation is employed since the unusual ease of operation of the pilot plunger 39, provided by the new valve construction, enables the actuating solenoids 51, 52 and return springs 53, 54, to be of greatly reduced capacity. Substantial savings may be effected by reason of the ability to use solenoids of reduced capacity and, moreover, further savings may be realized in the control system associated with the valve, due to substantial reduction in electrical power requirements and transient peaks. Thus, as mentioned previously, a valve assembly incorporating the features of the invention may use a solenoid actuator designed for a one ampere inrush current, for example, whereas a comparable, conventional valve may be expected to require a solenoid actuator capable of handling a fifteen ampere inrush current.

It should be understood that the specific, advantageous form of the invention herein illustrated and described is intended to be representative only, as certain changes may be made therein without departing from the clear teachings of the invention. Accordingly, reference should be made to the following appended claims in determining the full scope of the invention.

I claim:

1. A fluid valve assembly comprising a valve body having a valve bore therein, a valving spool received in said bore and slidable with respect to said body to predetermined valving positions, a pilot plunger received within said spool and slidable with respect to said spool and said body, resilient seals interposed between said body and plunger beyond the ends of said spool, cooperating means including said body, said plunger, effective end surfaces of said spool and each of said resilient seals defining pressure chambers, means forming restricted fluid flow paths leading from said pressure chambers to exhaust, means forming pressure fluid flow paths leading to said pressure chambers, and pilot valve means including said spool and said plunger operative when said plunger is shifted relative to said spool to connect one of said chambers to a source of fluid under pressure by a pressure fluid flow path, to shift said spool to one of said predetermined valving positions, said resilient seals being constructed normally to engage said plunger with a relatively light sealing pressure when said plunger is shifted relative to said spool to connect one of said chambers to a source of fluid under pressure through a pressure fluid flow path, said resilient seals engaging said plunger with increased sealing pressure when pressure fluid is applied thereto during shifting of said spool to one of said predetermined valving positions, the shifting of said valve spool to one of said predetermined valving positions following slidable movement of said plunger effecting cut-off of fluid pressure to the one of said chambers to which fluid was previously admitted under pressure, said that said flow paths to exhaust will cause pressure to decrease therein and sealing pressure against said plunger to decrease prior to a second shifting of said plunger.

2. The fluid valve assembly of claim 1, in which said resilient seals are of annular form and of U-shaped cross section.

3. A fluid valve assembly comprising a valve body having a valve bore therein, a valving spool received in said bore and slidable with respect to said body to predetermined valving positions, a pilot plunger received within said spool and slidable with respect to said spool and said body, means including portions of said spool forming pressure chambers at the ends of said spool, means forming pressure fluid flow paths leading to said pressure chambers, means for shifting said plunger relative to said spool and said body, pilot valve means operative when said plunger is shifted relative to said spool and said body to admit pressure fluid to said chambers to effect shifting movement of said spool to its respective valving positions, distortable sealing members engaging portions of said plunger and forming in part said chambers, said sealing members normally bearing with light pressure on said plunger when said plunger is shifted relative to said spool, said sealing members bearing on said plunger with increased pressure when said chambers are subjected to fluid under pressure during shifting movement of said spool to its respective valving positions, pressure fluid inlet means, including valve means controlled by movement of said plunger, leading to the respective pressure chambers, and fluid leakage paths leading from said chambers to exhaust, said leakage paths being relatively more restricted than said pressure fluid inlet means, the shifting of said valve spool to one of its valving positions following slidable movement of said plunger effecting cut-off of fluid pressure to the chamber to which fluid was previously admitted under pressure, such that one of said leakage paths to exhaust will cause pressure to decrease therein and sealing pressure against said plunger to decrease prior to a second shifting of said plunger.

4. The fluid valve of claim 3, which includes solenoid actuator means operatively associated with said plunger and adapted, upon energization, to shift said plunger to a position admitting pressure fluid to one of said chambers.

5. A fluid valve assembly comprising a plunger element, means forming a valve housing surrounding said plunger and mounting said plunger for slidable movement, a pressure fluid chamber formed in part by said plunger, a resilient sealing element forming in part said pressure chamber and normally bearing with relatively light pressure upon said plunger during slidable movement thereof, said sealing element bearing with increased force upon said plunger when said chamber is subjected to fluid under pressure, pressure fluid inlet means, including valve means controlled by movement of said plunger, leading to said chamber, and fluid exhaust means leading from said chamber and constantly open, said fluid exhaust means constituting a relatively more restricted fluid flow path than said fluid inlet means.

6. The fluid valve assembly of claim 5, in which said sealing element is an annular, resilient member of U-shaped cross-section, one leg portion of the U bearing upon said plunger and the open side of said U being exposed to the interior of said pressure chamber.

7. The fluid valve assembly of claim 5, in which said valve housing means comprises a valving spool, a valve body slidably receives said spool and cooperates with said spool in various valving positions thereof to control the flow of pressure fluid through said valve body, and said chamber is formed in part by an effective end surface portion of said spool, whereby said spool is shifted in said valve body upon the admission of pressure fluid to said chamber.

8. A fluid valve assembly comprising a valve body having a valve bore therein, a valving spool received in said bore and slidable with respect to said body to predetermined valving position, a pilot plunger received within said spool and slidable with respect to said spool and said body, chamber forming means including said spool and said plunger forming a pressure chamber exposed to an effective end surface of said spool, said chamber forming means further including a resilient, distortable sealing element, said sealing element normally engaging said plunger with relatively light pressure during slidable movement of said plunger and engaging said plunger with relatively greater pressure when said element is exposed to fluid under pressure in said chamber, pressure fluid inlet means, including valving means controlled by movement of said plunger, for admitting pressure fluid to said chamber to effect movement of said spool, and fluid exhaust passage means connected to said chamber at least upon movement of said plunger to a position to admit fluid under pressure to said chamber and consequential movement of said spool, the shifting of said valving spool to one of its predetermined valving positions following slidable movement of said plunger effecting cut-off of fluid pressure to the chamber to which fluid was previously admitted under pressure, such that said fluid exhaust passage means will cause pressure to decrease in said chamber and sealing pressure against said plunger to decrease prior to a second shifting of said plunger.

9. A fluid valve assembly comprising a valve body having a valve bore therein, a valving spool received in said bore and slidable with respect to said body to predetermined valving position, a pilot plunger received within said spool and slidable with respect to said spool and said body, chamber forming means including said spool and said plunger forming a pressure chamber exposed to an effective end surface of said spool, said chamber forming means further including a resilient, distortable sealing element, said sealing element normally engaging said plunger with relatively light pressure and engaging said plunger with relatively greater pressure when said element is exposed to fluid under pressure in said chamber, pressure fluid inlet means, including valving means controlled by movement of said plunger, for admitting pressure fluid to said chamber to effect movement of said spool, fluid exhaust passage means connected to said chamber at least upon movement of said plunger to a position to admit fluid under pressure to said chamber and consequential movement of said spool, said plunger extending axially beyond one end of said spool, said spool having an axial recess therein of greater diameter than end portions of said plunger whereby to define a first annular passage for the flow of pressure fluid axially outward of said spool and into said pressure chamber, said spool having a cylindrical end portion, portions of said valve body defining a cylindrical opening of greater diameter than the cylindrical end portion of said spool and forming therewith a second annular passage connecting said pressure chamber to exhaust, said first annular passage being of greater effective area than said second annular passage.

10. A fluid valve assembly comprising means forming a valve housing, a plunger movably received in said housing, a pressure chamber formed in part by said plunger, a resilient, distortable sealing element engaging said plunger and forming in part said chamber, said sealing element normally engaging said plunger with light pressure during movement of said plunger and engaging said plunger with increased pressure when said chamber is subjected to fluid under pressure, pressure fluid inlet means, including valve means actuated upon movement of said plunger relative to said sealing element, to admit fluid under pressure to said chamber, and exhaust passage means effective independent of further movement of said plunger to release pressure fluid from said chamber.

11. The fluid valve assembly of claim 10, in which said exhaust passage means open substantially constantly between said chamber and exhaust, and said pressure fluid inlet means is of greater effective area than said exhaust passage means.

12. The fluid valve assembly of claim 11, which includes valve means responsive to fluid pressure in said chamber to close off said pressure fluid inlet means.

13. A fluid valve assembly comprising a valve body having a valve bore therein, a valving spool received in said bore and slidable with respect to said body to predetermined valving position, a pilot plunger received within said spool and slidable with respect to said spool and said body, chamber forming means including said spool and said plunger forming a pressure chamber exposed to an effective end surface of said spool, means sealing said plunger for preventing leakage of fluid from said chamber, pressure fluid inlet means, including valving means controlled by movement of said plunger, for admitting pressure fluid to said chamber to effect movement of said spool, fluid exhaust passage means connected to said chamber at least upon movement of said plunger to a position to admit fluid under pressure to said chamber and consequential movement of said spool, said plunger extending axially beyond one end of said spool, said spool having an axial recess therein of greater diameter than end portions of said plunger whereby to define a first annular passage for the flow of pressure fluid axially outward of said spool and into said pressure chamber, said spool having a cylindrical end portion, portions of said valve body defining a cylindrical opening of greater diameter than the cylindrical end portion of said spool and forming therewith a second annular passage connecting said pressure chamber to exhaust, said first annular passage being of greater effective area than said second annular passage.

References Cited in the file of this patent

UNITED STATES PATENTS

| 2,526,709 | Tait | Oct. 24, 1950 |
| 3,005,616 | Seele | Oct. 24, 1961 |

FOREIGN PATENTS

| 1,176,707 | France | Nov. 24, 1958 |

UNITED STATES PATENT OFFICE
CERTIFICATE OF CORRECTION

Patent No. 3,060,969                                          October 30, 1962

Wilfred Aslan

It is hereby certified that error appears in the above numbered patent requiring correction and that the said Letters Patent should read as corrected below.

Column 4, line 41, for "predtermined" read -- pre-determined --; line 51, for "in", first occurrence, read -- is --; column 5, line 75, for "said" read -- such --; column 6, lines 62 and 63, for "U", each occurrence, read -- "U" --.

Signed and sealed this 9th day of April 1963.

(SEAL)
Attest:

ESTON G. JOHNSON                                        DAVID L. LADD
Attesting Officer                                            Commissioner of Patents